Aug. 23, 1966 G. HOHWART ETAL 3,267,580
ADJUSTABLE BORE GAUGE
Filed April 21, 1961 2 Sheets-Sheet 1
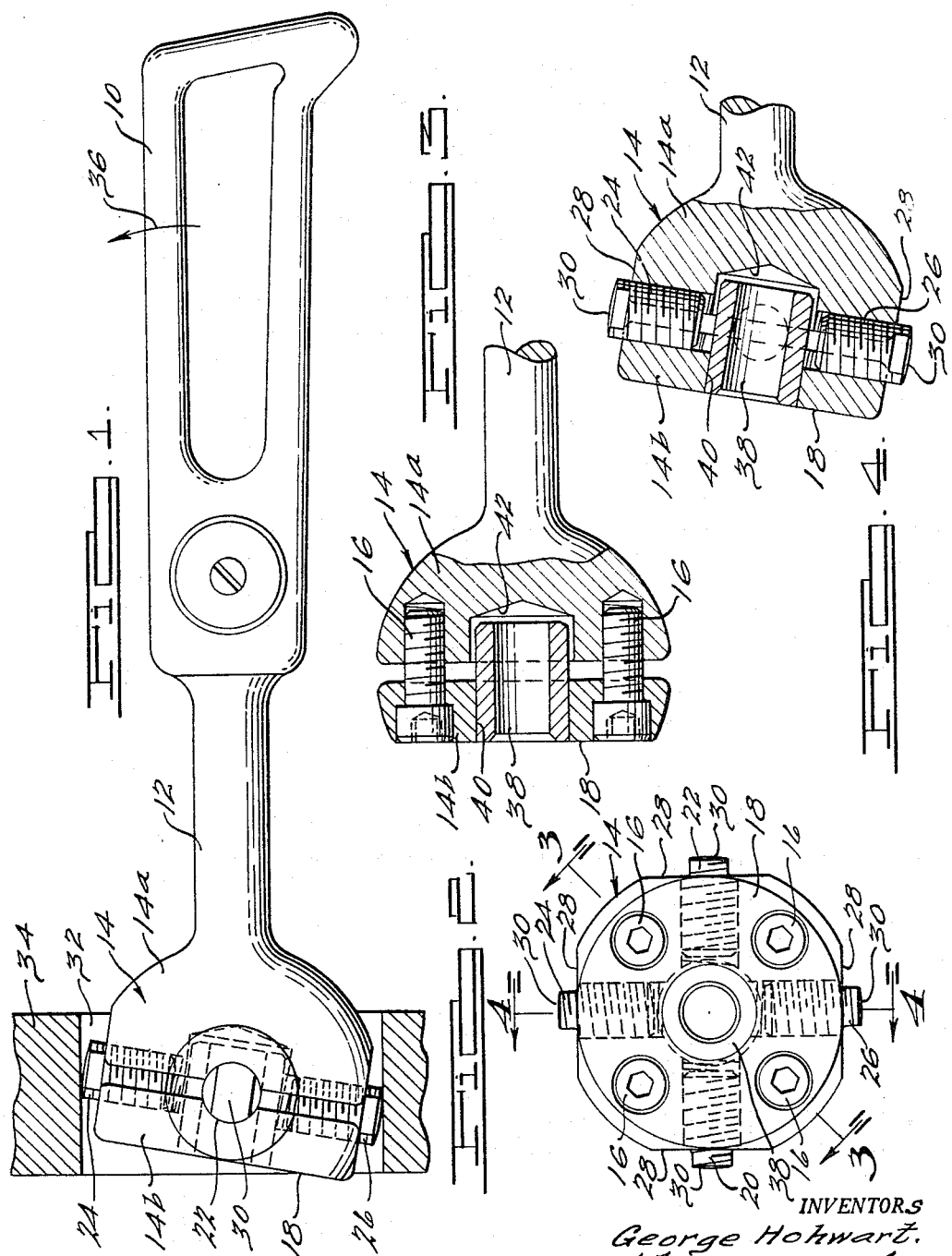
INVENTORS
George Hohwart.
Vitos J. Brundza.
BY
Harness, Dickey & Pierce.
ATTORNEYS

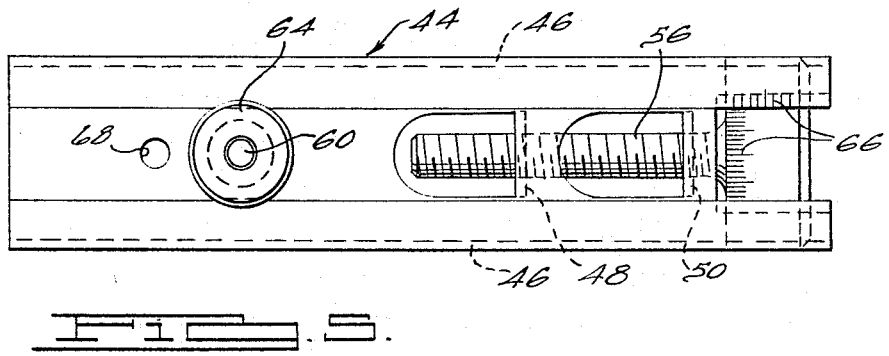
FIG. 5.
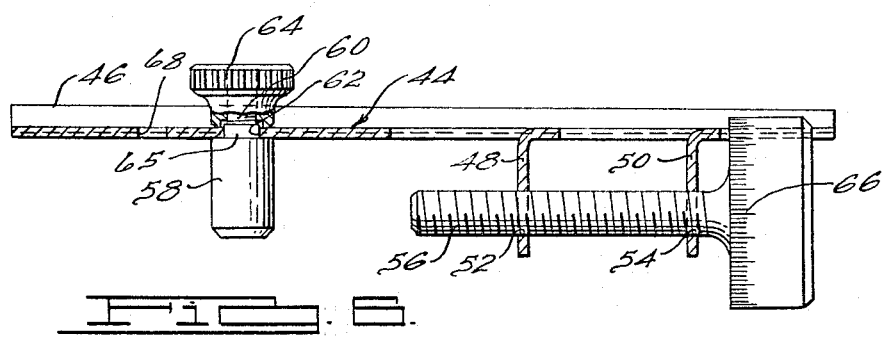
FIG. 6.
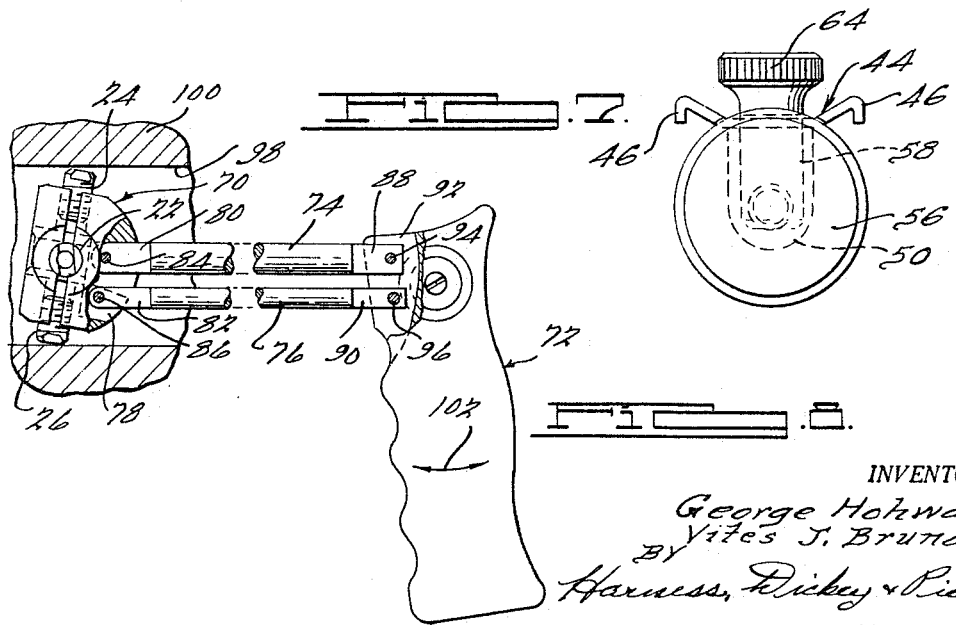
FIG. 7.
FIG. 8.
INVENTORS.
George Hohwart
Vitas J. Brundza
BY
Harness, Dickey & Pierce.
ATTORNEYS.

United States Patent Office 3,267,580
Patented August 23, 1966

3,267,580
ADJUSTABLE BORE GAUGE
George Hohwart, Farmington Township, and Vites Joseph Brundza, Detroit, Mich., assignors to N. A. Woodworth Company, Ferndale, Mich., a corporation of Michigan
Filed Apr. 21, 1961, Ser. No. 104,638
8 Claims. (Cl. 33—178)

This invention relates to new and useful improvements in bore gauges.

As the name suggests, a bore gauge is used to determine whether the bore or a hole in a workpiece is within the required tolerance range. The general practice is to provide separate "go" and "no go" gauges. If the "go" gauge enters the bore, it is larger than the minimum tolerance dimension and if the "no go" gauge will not enter the bore, it is smaller than the maximum tolerance dimension. In a typical operation, the workman first inserts the "go" gauge in the bore to be checked and then removes it and lays it down. He then picks up the "no go" gauge and tries it. Manifestly, this requires two separate operations. The present gauge combines the "go" and "no go" gauges in one instrument and reduces the checking time by one-half.

Succinctly, the gauge of this invention comprises a handle provided at one end thereof with a head having an end face normally tilted with respect to the handle and a centrally disposed pilot hole opening through and normal to the end face. A pair of diametrically opposed longitudinally adjustable "go" pins are carried by the head on opposite sides of and equidistantly from the pilot hole. Similarly, a pair of diametrically opposed longitudinally adjustable "no go" pins are carried by the head at right angles to and in the same transverse plane as the "go" pins on opposite sides of and equidistantly from the pilot hole. By reason of the fact that the "go" and "no go" pins are longitudinally adjustable, they can be set to measure different size bores and they can be readily adjusted to check different tolerance limits.

The two sets of pins can be set accurately and quickly using a fixture having a pilot stud adapted to fit in and to be snugly received by the pilot hole of the gauge and a measuring screw disposed laterally of and at right angles to the stud. The measuring screw is adjustable to register accurately the distance between the end of the screw and the center of the stud. Thus by rotating the gauge on the stud as required to bring the "go" pins successively into register with the measuring screw and adjusting the pins to contact the end of the screw, the pins can be set quickly and accurately to the "go" dimension and the ends of the pins will be disposed substantially precisely equidistantly from the center of the gauge. In a similar manner, the "no go" pins can be set easily and quickly to the "no go" dimension. When the gauge pins are properly set in the manner described, the "go" pins are at diametrically opposite sides of the gauge and equidistantly from the center thereof. The "no go" pins also are at diametrically opposite sides of the gauge equidistantly from the center thereof and at right angles to the "go" pins.

The head of the gauge is tilted at an angle with respect to the handle; and, because of this angular relationship, all four of the gauge pins can be inserted into a properly sized bore to be tested. After the head of the gauge has been inserted into the bore, the handle is pivoted about an axis extending through the "go" pins in a direction to bring the "no go" pins normal to the axis of the bore. If the "go" pins enter the bore and the "no go" pins wedge as the handle is tilted in this manner, the bore is to proper tolerance. However, if the "no go" pins move past the right angular position, the bore is oversize. Contrariwise, if the bore will not receive the "go" pins in the first instance, it is undersize.

Although not in common use, special bore gauges have been developed in which the "go" and "no go" gauges are combined in a single tool. Special gauges of this type are shown in the Tornebohn Patent No. 1,793,763, the Aldeborgh et al. Patent No. 2,470,755, the Mueller et al. Patent No. 2,577,262 and the Tornebohn Patent No. 2,733,516. However, in these gauges, the "go" and "no go" components are either separate gauge elements mounted on a single handle or they are simply finished surfaces on the tool. This, of course, requires that the feeler surfaces be carefully machined to a precise tolerance dimension, and the gauge therefor is not adaptable to a change in the tolerance dimension. As a consequence, the gauge is expensive to manufacture and is limited in use.

An important object of the present invention is to provide a bore gauge that is uniquely constructed to be manufactured relatively inexpensively and adaptable to a relatively competitive market situation.

Another object of the invention is to provide a bore gauge of the above-mentioned character wherein both the "go" and "no go" sensing components are easily adjustable to precise "go" and "no go" dimensions.

Yet another object of the invention is to provide a bore gauge of the above-mentioned character wherein the dimensions sensed by the "go" and "no go" components can be varied easily and quickly within limits whereby to adapt the gauge to changing service conditions.

Still another object of the invention is to provide a fixture that can be used in combination with the bore gauge of this invention to set the "go" and "no go" components easily and quickly to a desired size.

Other objects and advantages of the invention will be apparent during the course of the following description:

In the drawings forming a part of this specification like numerals are employed to designate like parts throughout the same.

FIG. 1 is a side elevational view showing a bore gauge embodying the instant invention in operative association with a workpiece;

FIG. 2 is an end elevational view of the gauge;

FIG. 3 is a fragmentary longitudinal sectional view taken on the line 3—3 of FIGURE 2;

FIG. 4 is a fragmentary longitudinal sectional view taken on the line 4—4 of FIGURE 2;

FIG. 5 is a plan view of the fixture used for rough setting of the "go" and "no go" components of the gauge;

FIG. 6 is a side elevational view of the fixture;

FIG. 7 is an end elevational view thereof; and

FIG. 8 is a side elevational view showing a modified gauge embodying the invention adapted particularly for checking deep holes or bores, parts of the gauge being broken away and shown in section for clearness of illustration.

As shown in FIGURE 1, the gauge of this invention has a handle 10 shaped to fit the hand comfortably. At one end of the handle 10 is a neck portion 12, and a generally circular head portion 14. In the form of the invention here shown, the head portion 14 comprises separate inner and outer parts 14a and 14b, respectively, connected by screws 16. For reasons hereinafter apparent, the head 14 is formed so that the end face 18 thereof is inclined or in acute angular relation with respect to the longitudinal axis of the handle 10 and neck 12.

Clamped between the parts 14a and 14b is a pair of "go" pins 20 and 22. These pins are arranged in diametrically opposed relation, as shown in FIG. 2, and extend radially equidistantly from the center of the head. Also clamped between the parts 14a and 14b is a pair of "no go" pins 24 and 26. As shown in FIGURE 2, the pins 24 and 26 are disposed in diametrically opposed relation with respect to each other and at right angles to the "go" pins 20 and 22. It will be observed also that the "no go" pins 24 and 26 project equidistantly radially from the center of the head 14. Preferably, the peripheral areas of the head 14 through which the "go" and "no go" pins 20-26 extend are flattened as at 28. The outer ends 30 of all pins 20-26 are spherically curved and the radius of curvature preferably is less than the radius of the hole or bore to be tested so as to provide, in effect, ball ends on the pins and to establish a point contact between the wall of the hole and the ends of the pins.

All four of the gauge pins 20-26 are externally threaded and they are disposed in correspondingly internally threaded holes in the head 14 so that the pins can be individually adjusted longitudinally by turning them in one direction or the other. The holes which receive the gauge pins 20-26 are drilled and tapped with the outer head part 14b spaced a selected predetermined distance from the inner head part 14a. The holes are, of course, drilled to the same diameter as the gauge pins 20-26 so that the latter fit properly in the holes when the head parts 14a and 14b are spaced the predetermined distance apart, and the external threads of the gauge pins match properly with the internal threads of the holes. When it is desired to adjust the gauge pins 20-26, the screws 16 are loosened so that the pins are lightly clamped by the outer head part 14b. The pins can then be easily rotated for longitudinal adjustment. After the gauge pins have been properly adjusted, the screws 16 are tightened to clamp the pins securely between the two parts 14a and 14b of the head 14. When the screws 16 are properly tightened, the gauge pins 20-26 can no longer be rotated but are held immovable in the adjusted position. In practice, the "go" pins 20 and 22 are set precisely to the minimum tolerance dimension of the hole or bore to be checked and the "no go" pins 24 and 26 are set precisely to the maximum tolerance dimension thereof.

In use, the gauge is inserted into the hole 32 of a workpiece 34 shown in FIG. 1. If the hole 32 is properly to size within the tolerance limits for which the gauge is set, the "go" pins 20 and 22 will easily enter the hole. In this connection, it will be observed that the gauge is inserted in the hole to be checked with the "go" pins 20 and 22 horizontal and the handle 10 generally parallel to the axis of the hole. In this position of the gauge, the "no go" pins 24 and 26 are inclined from the vertical because of the tilted relationship between the head 14 and the shank 12. Because of the inclined or tilted position of the "no go" pins 24 and 26, they also will enter the hole when the gauge is positioned as shown in FIG. 1 even though the distance between the distal ends of the pins measured along the axes thereof may be and properly should be greater than the diameter of the hole 32. The mere fact that the hole 32 will accept the "go" pins 20 and 22 in the manner described is evidence that the hole is larger than the minimum tolerance dimension for which the gauge is set. After the gauge has been inserted in the hole 32 as described to check the minimum tolerance dimension, it is rocked in the direction of the arrow 36 in FIG. 1 to check the maximum tolerance dimension. Manifestly, angular or rocking movement of the gauge in this direction tends to bring the "no go" pins 24 and 26 to a position normal to the axis of the hole. If the "no go" pins 24 and 26 wedge in the hole 32 before reaching the normal position, the operator knows that the hole is smaller than the maximum tolerance dimension. On the other hand, if the gauge can be moved angularly to rock the "no go" pins 24 and 26 to and perhaps through the normal position, the operator is apprised that the hole is oversize; vis, that its diameter is greater than the maximum tolerance dimension.

In order for the gauge to function properly, it is essential that the two pins or each pair be positioned as exactly as possible equidistantly from the center of the head 14. This is accomplished according to the present invention by providing a pilot bushing 38 in the exact center of the head. In the particular structure shown here by way of example, the bushing 38 is mounted in a central opening 40 provided in the outer head part 14b. It is desirable that the bushing 38 be relatively long and in the form of the invention shown, it extends substantially inwardly from the head part 14b and into a socket 42 provided in the inner head part 14a. The bushing 38 fits the hole 40 essentially tightly so that the bushing is in effect fixed to and carried by the outer head part 14b. By reason of the fact that pilot bushing 38 is precisely centered in the head 14, it provides a means for determining whether the "go" and "no go" pins 20-26 are positioned properly with respect to the center of the head 14, and it provides a means that can be used effectively in adjusting or setting these pins properly with respect to the center of the head.

Attention is now directed to FIGS. 5-7 which show a fixture that is particularly suitable for use in rough setting the "go" and "no go" pins 20-26. The fixture comprises a base or main support 44 perferably of sheet metal. As shown, the support 44 is of generally elongate rectangular form, and if desired the longitudinal edges thereof can be flanged as at 46 to strengthen and stiffen the main body of the support. Spaced parallel flanges 48 and 50 provided adjacent one end of the base have aligned internally threaded holes 52 and 54 which receive the measuring screw 56. In the construction here shown, the flanges 48 and 50 are struck and bent downwardly from the support 44. A stud 58 is carried by the support 44 opposite and spaced longitudinally form the end of the screw 56. As shown, the stud 58 has a threaded shank 60 which extends through an opening 62 in the support 44 and a thumb nut 64 on the projecting end of the shank holds the stud securely but removably attached to the support. An unthreaded pilot portion 65 at the base of the shank 60 fits the opening 62 snugly to position the stud accurately with respect to the screw 56. Calibrations 66 on the head of screw 56 and the support 44 provide an accurate reading of the distance between the end of the screw and the center of the stud 58.

In use, the pilot bushing 38 on the gauge is fitted on the stud 58 and the screw 56 is adjusted to the tolerance dimension desired for one set of gauge pins. For example, if it desired to set the "go" pins 20 and 22, the screw 56 is set to the "go" tolerance dimension. The gauge is then positioned to bring one of the "go" pins into alignment with the screw 56, and the pin is adjusted longitudinally until the pin engages the end of the screw. Of course, the gauge screws 16 are loosened sufficiently at this time to permit turning and consequently adjustment of the gauge pins. The gauge is then turned to bring the opposite "go" pin into alignment with the screw 56 and this pin also is adjusted longitudinally to engage the end of the screw. The screw 56 is then adjusted to the desired "no go" dimension and the operation is repeated successively with the two "no go" pins 24 and 26. In this manner, the two pins in each set of pins are centralized relatively precisely on the head and they can be set to within a few thousandths of an inch of a desired "go" or "no go" dimension. After being rough set in the manner described, final precision adjustments for size are made and checked by conventional gauging methods using a comparator or a micrometer. A final setting to within a tenth of a thousandth can be easily achieved in this manner. Any difference in the centralized position of the gauge pins as a result of the final setting operation is not significant in use.

In a typical device, the micrometer screw 56 has a range of one-half which means that the fixture has a total gauge-setting range of one inch. If desired, however, the range of the fixture can be increased substantially any desired amount by providing extra holes for the gauge receiving stud 58. In the drawing, one such extra hole 68 is shown. By spacing the stud mounting holes on one inch centers, they complement the adjustment range of the micrometer screw 56 and permit the full range of possible adjustment to be utilized.

While the fixture hereinabove described is useful and provides a preferred means for rough setting gauge pins, the latter can if desired be rough set without the fixture but using the pilot bushing 38. More particularly, a standard close fitting pin such as a dowel pin or a piece of drill rod is inserted into the pilot bushing 38. The pin should be long enough to extend outwardly from the bushing, and the projecting portion thereof is then clamped securely in a suitable V block, vise or the like. The gauge pins are then centralized by passing the pins under an indicator gauge associated with the mounting or holding device. A final precision setting of the gauge pins for size is then made by procedures well known to those skilled in the trade using a conventional precision checking device such as a comparator or a micrometer.

Attention is now directed to FIGURE 8 which shows a modified form of the invention adapted particularly for checking size, taper and out-of-roundness of relatively deep holes and bores. In general, it is difficult to check a deep hole with a gauge of the type shown in FIGURE 1, for example, because of interference between the handle 10 or neck 12 and the workpiece at the mouth of the hole. A hole of any depth normally encountered in use can be checked by a gauge of the type shown in FIGURE 8.

The deep hole gauge has a head portion 70 connected to a pistol grip handle 72 by a pair of pivoted rod members 74 and 76. The head 70 is generally similar to the head 14 of the gauge first described and a detailed description of it, therefore, is not given in connection with this form of the invention. As in the first form of the invention, the head 70 has a pair of "go" pins 20 and 22 and a pair of "no go" pins 24 and 26 clamped between separate front and rear parts of the head. Also, the front part of the head 70 has a central bushing which is adapted to fit over the stud 58 of the fixture shown in FIGS. 5-7 for setting or adjusting the gauge pins 20-26. The "go" pins are set to the minimum tolerance dimension and the "no go" pins are set to the maximum tolerance dimension as in conventional practice.

In the modified construction of FIG. 8, a slot 78 is provided in the rear of head 70 which receives flattened forward portions 80 and 82 of the rods 74 and 76, respectively. The slot 78 extends generally parallel to the "no go" pins 24 and 26. Pivots 84 and 86 fasten the inserted ends of the rods 74 and 76 to the head 70 and permit the latter to rock or oscillate on the pivots and relative to the rods. Similarly, flattened portions 88 and 90 at the other ends of the rods 74 and 76 extend into a vertical slot 92 in the handle 72 and these ends of the rods are secured to the handle by pivots 94 and 96. The lower rod 76 preferably is slightly longer than the upper rod 74 to hold the head 70 normally tilted with respect to the handle 72, as shown in the drawing, and the upper rod 74 engages the upper end of the slot 78 to hold the parts normally in the relative positions shown and to prevent the head 70 from dropping too far or dangling from the handle 72 when the gauge is supported solely by the handle.

In use, the head 70 of the gauge is inserted into the bore 98 of a workpiece 100 and the handle 72 is then rocked back and forth as indicated by the arrow 102 to tilt the head in the bore. When the head is in its normal tilted position, all four checking pins 20-26 readily enter the hole 98 even though the distance between the ends of the "no go" pins is greater than the diameter of the hole. If the "go" pins will not enter the hole, the operator, of course, knows immediately that the hole is undersize. On the other hand, if the "go" pins enter the hole, the checker is immediately apprised that the hole is at least as large as the minimum tolerance dimension. When the handle 72 is rocked counterclockwise as viewed in FIG. 8, it rocks the head 70 in the same direction through the twin linkage rods 74 and 76. This, of course, causes the "no go" pins 24 to move toward a position normal to the axis of the hole. The rods 74 and 76 permit the "no go" pins to swing through the normal position before striking the ends of the slots 78. Thus, if the head moves to the full forward position permitted by the rods 74 and 76, the checker knows that the hole is oversize. On the other hand, if the "no go" pins bind in the hole at some point short of the full forward position, the checker knows that the hole is smaller than the maximum permissible tolerance dimension. On the other hand, rocking of the handle 72 in a clockwise direction as viewed in the drawing quickly and positively disengages the "no go" pins from the wall of the hole 98 to permit repositioning or withdrawal of the head 70.

If desired, the checking head 70 can be moved to different selected positions along the length of the hole 98 to check at each of these locations. Also, if desired, the gauge can be rotated to turn the head 70 in the hole at each of the selected locations to check the hole for out-of-roundness. In practice, the operator soon gets the "feel" of the gauge and can quickly check an essentially deep hole or bore for size, taper and out-of-roundness. The ability of the rods 74 and 76 to rock the head 70 positively both clockwise and counterclockwise upon manual rocking or tilting of the handle 72 assures easy operation of the gauge and provides the operator with an extraordinary "feel" of the bore 98 even through he may not actually be able to see the gauge pins. Also, power operation of the head 70 in both directions through the rods 74 and 76 facilitates proper engagement of the "no go" pins 24 and 26 with the bore 98 and assures positive release of the "no go" pins after the checking operation. Binding of sticking of the gauge head 70 even in a relatively deep bore is positively prevented.

What is claimed is:

1. An adjustable bore gauge provided with a head having a pilot hole therein adapted to receive an element of a fixture used in the adjustment of said gauge, a pair of diametrically opposed "go" pins carried by said head on opposite sides thereof, means mounting said pins for longitudinal adjustment and for positioning equidistantly from said pilot hole, means mounting a pair of diametrically opposed "no go" pins on said head at right angles to and in the same transverse plane as said "go" pins and at opposite sides of said pilot hole also for longitudinal adjustment and for positioning equidistantly from said pilot hole, said "go" pins adapted to be positioned a predetermined minimum distance apart and said "no go" pins adapted to be positioned a predetermined maximum distance apart.

2. An adjustable bore gauge comprising a head, a handle, means connecting the head to the handle, said head provided with an end face having a pilot hole therein adapted to receive an element of a fixture used in the adjustment of said gauge, a pair of diametrically opposed, longitudinally adjustable "go" pins carried by said head at opposite sides thereof with the longitudinal axes of the pins at right angles to the axis of said pilot hole, and a pair of diametrically opposed, longitudinally adjustable "no go" pins carried by said head at right angles to and in the same plane as the said "go" pins at opposite sides of said pilot hole and with the longitudinal axes thereof at right angles to the axis of said pilot hole.

3. The combination as set forth in claim 2 wherein the head of said gauge is formed in two parts and all of said pins are clamped between said parts.

4. The combination as set forth in claim 2 wherein the head of said gauge is formed in separate top and bottom parts, wherein all of said pins are clamped between said top and bottom parts, and wherein said pilot hole is defined by a pilot bushing carried by one of said parts.

5. An adjustable bore gauge comprising a handle, a head on one end of said handle provided with an end face disposed in acute angular relation with respect to the longitudinal axis of said handle and having a pilot hole therein and extending at right angles thereto said pilot hole adapted to receive an element of a fixture used in the adjustment of said gauge, a pair of diametrically opposed "go" pins carried by said head at opposite sides thereof with the longitudinal axes of the pins on a line at right angles to the longitudinal axis of said pilot hole, said pins being longitudinally adjustable for positioning equidistantly from said pilot hole, and a pair of diametrically opposed "no go" pins carried by said head at right angles to and in the same transverse plane as said "go" pins and at opposite sides of and normal to the axis of said pilot hole, said "no go" pins also being longitudinally adjustable for positioning equidistantly from said pilot hole.

6. An adjustable bore gauge comprising a checking head having right angularly disposed pairs of "go" and "no go" pins, a handle and a pair of rigid connecting members each pivoted to said head and also to said handle, said connecting members being substantially parallel to each other and closely spaced and disposed in the same relation with respect to each other and to said head as said "no go" pins, whereby to rock said head about said "go" pins upon oscillatory movement of said handle.

7. An adjustable bore gauge comprising a checking head having right angularly disposed pairs of "go" and "no go" pins, a handle, a pair of rigid connecting members each pivoted to said head and also to said handle said connecting members being substantially parallel to each other and closely spaced, said connecting members and said "no go" pins being in coplanar relation, whereby oscillatory movement of said handle rocks said head about said "go" pins, and means for limiting rocking movement of said head.

8. An adjustable deep bore gauge comprising a checking head having laterally extending "go" pins and vertically extending "no go" pins and an elongated slot in the back thereof extending parallel to said "no go" pins, a handle, and a pair of vertically spaced rigid members, each of said members extending at one end into said slot and each being pivotally connected at one end to said head and pivotally connected at the other end thereof to said handle, said connecting members being substantially parallel to each other and closely spaced whereby oscillatory movement of said handle rocks said head about said "go" pins, the ends of said slot engaging said connecting members to limit rocking movement of said head.

References Cited by the Examiner

UNITED STATES PATENTS

| | | | |
|---|---|---|---|
| 1,169,327 | 1/1916 | Hess | 33—178 |
| 1,511,624 | 10/1924 | McGuckin | 33—143 |
| 2,443,881 | 6/1948 | Aldeborgh | 33—178 |
| 2,546,154 | 3/1951 | Gardner | 33—178 |

FOREIGN PATENTS

| | | |
|---|---|---|
| 216,315 | 11/1905 | Germany. |
| 633,638 | 7/1936 | Germany. |
| 608,171 | 9/1948 | Great Britain. |
| 109,413 | 10/1963 | Sweden. |

LEONARD FORMAN, *Primary Examiner.*

ISAAC LISANN, *Examiner.*

C. T. WOOD, W. B. KICE, *Assistant Examiners.*